US011836825B1

(12) United States Patent
Tan et al.

(10) Patent No.: US 11,836,825 B1
(45) Date of Patent: Dec. 5, 2023

(54) SYSTEM AND METHOD FOR DETECTING POSTURES OF A USER OF AN INFORMATION HANDLING SYSTEM (IHS) DURING EXTREME LIGHTING CONDITIONS

(71) Applicant: Dell Products, L.P., Round Rock, TX (US)

(72) Inventors: Loo Shing Tan, Singapore (SG); Seng Khoon Teh, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/664,480

(22) Filed: May 23, 2022

(51) Int. Cl.
*G06T 7/73* (2017.01)
*G06V 10/50* (2022.01)
*G06V 10/766* (2022.01)
*H04N 23/11* (2023.01)

(52) U.S. Cl.
CPC ............ *G06T 7/74* (2017.01); *G06V 10/50* (2022.01); *G06V 10/766* (2022.01); *H04N 23/11* (2023.01); *G06T 2207/10048* (2013.01); *G06T 2207/30196* (2013.01)

(58) Field of Classification Search
CPC ...... G06V 10/50; G06V 10/766; H04N 23/11; H04N 23/12; G06T 2207/10048; G06T 2207/30196
See application file for complete search history.

(56) References Cited

U.S. PATENT DOCUMENTS

| 11,663,367 | B1* | 5/2023 | Tseng | .................... | G06F 21/84 |
| | | | | | 345/691 |
| 2013/0286236 | A1* | 10/2013 | Mankowski | .......... | H04N 23/11 |
| | | | | | 348/222.1 |

(Continued)

FOREIGN PATENT DOCUMENTS

| CN | 109241908 A | * | 1/2019 |
| CN | 110135304 A | * | 8/2019 |

(Continued)

OTHER PUBLICATIONS

X. Zhong, T. Lu, W. Huang, M. Ye, X. Jia and C. -W. Lin, "Grayscale Enhancement Colorization Network for Visible-Infrared Person Re-Identification," in IEEE Transactions on Circuits and Systems for Video Technology, vol. 32, No. 3, pp. 1418-1430, Mar. 2022, doi: 10.1109/TCSVT.2021.3072171. (Year: 2022).*

(Continued)

*Primary Examiner* — Michael Robert Cammarata
(74) *Attorney, Agent, or Firm* — Fogarty LLP

(57) ABSTRACT

Methods and systems are provided for determining a posture of a user of an Information Handling System (IHS) during extreme lighting conditions. In particular, the HIS include executable instructions to utilize the visual light camera of the IHS to generate a visual light image of a user of the HIS, identify a plurality of physical feature landmarks of the user in the visual light image such that when a quality of the received visual light image goes below a specified minimum image quality level, utilizing the IR camera of the Information Handling System (IHS) to generate an IR image of the user, and identify the physical feature landmarks of the user based on the IR image.

17 Claims, 4 Drawing Sheets

(56) References Cited

U.S. PATENT DOCUMENTS

| | | | | |
|---|---|---|---|---|
| 2016/0202757 | A1* | 7/2016 | Miao | H04N 23/611 |
| | | | | 348/78 |
| 2017/0013191 | A1* | 1/2017 | Saad | G06V 20/35 |
| 2020/0389579 | A1* | 12/2020 | Ise | G06T 5/50 |
| 2021/0160441 | A1* | 5/2021 | Bleyer | G02B 27/0172 |
| 2022/0051437 | A1* | 2/2022 | Ostadabbas | G06T 7/50 |
| 2022/0108114 | A1* | 4/2022 | Yoshida | G06T 7/70 |
| 2022/0114380 | A1* | 4/2022 | Sankaradas | G06T 7/55 |
| 2022/0182534 | A1* | 6/2022 | Bleyer | G02B 27/0172 |
| 2022/0230455 | A1* | 7/2022 | Popovic | G06V 20/59 |
| 2022/0287607 | A1* | 9/2022 | Devani | A61B 5/163 |
| 2023/0171474 | A1* | 6/2023 | Shimotsu | H04N 23/55 |
| | | | | 348/164 |
| 2023/0177830 | A1* | 6/2023 | Wei | A01G 7/045 |
| | | | | 348/135 |
| 2023/0179613 | A1* | 6/2023 | Andrews | H04L 63/1425 |
| | | | | 726/23 |

FOREIGN PATENT DOCUMENTS

| | | | | |
|---|---|---|---|---|
| CN | 113111844 | A * | 7/2021 | ......... G06K 9/00228 |
| CN | 113609993 | A * | 11/2021 | |
| CN | 114511821 | A * | 5/2022 | |
| EP | 3611691 | B1 * | 4/2021 | ......... G06K 9/00228 |
| EP | 4134911 | A1 * | 2/2023 | |
| WO | WO-2020078243 | A1 * | 4/2020 | ......... G06K 9/00268 |
| WO | WO-2022009419 | A1 * | 1/2022 | |

OTHER PUBLICATIONS

M. Hassan, J. Eberhardt, S. Malorodov and M. Jäger, "Robust Multiview 3D Pose Estimation Using Time of Flight Cameras," in IEEE Sensors Journal, vol. 22, No. 3, pp. 2672-2684, 1 Feb. 1, 2022, doi: 10.1109/JSEN.2021.3133108. (Year: 2022).*

Nguyen DT, Park KR. Enhanced Gender Recognition System Using an Improved Histogram of Oriented Gradient (HOG) Feature from Quality Assessment of Visible Light and Thermal Images of the Human Body. Sensors (Basel). Jul. 21, 2016;16(7):1134. doi: 10.3390/s16071134. PMID: 27455264; PMCID: PMC4970176. (Year: 2016).*

S. Iwasawa, K. Ebihara, J. Ohya and S. Morishima, "Real-time estimation of human body posture from monocular thermal images," Proceedings of IEEE Computer Society Conference on Computer Vision and Pattern Recognition, San Juan, PR, USA, 1997, pp. 15-20, doi: 10.1109/CVPR.1997.609290. (Year: 1997).*

Berg, Amanda, Jorgen Ahlberg, and Michael Felsberg. "Generating visible spectrum images from thermal infrared." Proceedings of the IEEE Conference on Computer Vision and Pattern Recognition Workshops. 2018. (Year: 2018).*

Nguyen DT, Hong HG, Kim KW, Park KR. Person Recognition System Based on a Combination of Body Images from Visible Light and Thermal Cameras. Sensors (Basel). Mar. 16, 2017;17(3):605. doi: 10.3390/s17030605. PMID: 28300783; PMCID: PMC5375891. (Year: 2017).*

Q. -C. Pham, L. Gond, J. Begard, N. Allezard and P. Sayd, "Real-Time Posture Analysis in a Crowd using Thermal Imaging," 2007 IEEE Conference on Computer Vision and Pattern Recognition, Minneapolis, MN, USA, 2007, pp. 1-8, doi: 10.1109/CVPR.2007.383496. (Year: 2007).*

Seong G. Kong, Jingu Heo, Besma R. Abidi, Joonki Paik, Mongi A. Abidi, Recent advances in visual and infrared face recognition—a review, Computer Vision and Image Understanding, vol. 97, Issue 1, 2005, pp. 103-135 (Year: 2005).*

G. Wang, T. Zhang, J. Cheng, S. Liu, Y. Yang, and Z. Hou, "RGB infrared cross-modality person re-identification via joint pixel and feature alignment," in Proc. IEEE/CVF Int. Conf. Comput. Vis. (ICCV), Oct. 2019, pp. 3622-3631. (Year: 2019).*

Patel, Ami, and Jayesh Chaudhary. "A review on infrared and visible image fusion techniques." Intelligent Communication Technologies and Virtual Mobile Networks: ICICV 2019 (2020): 127-144. (Year: 2020).*

* cited by examiner

SYSTEM AND METHOD FOR DETECTING POSTURES OF A USER OF AN INFORMATION HANDLING SYSTEM (IHS) DURING EXTREME LIGHTING CONDITIONS

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

IHSs that are utilized for personal use, such personal computers, laptops, tablets, smartphones, etc., are increasingly likely to be regularly utilized for long intervals of time. Uninterrupted use of IHSs without breaks has been demonstrated to be potentially harmful, both physically and psychologically, to the user. For instance, users may experience physical side effects from regular and continued use of an IHS while physically positioned in non-ergonomic postures, such as while slouching in a chair.

SUMMARY

According to one embodiment, a system and method are provided for determining a posture of a user of an Information Handling System (IHS) during extreme lighting conditions. In particular, the HIS include executable instructions to utilize the visual light camera of the IHS to generate a visual light image of a user of the HIS, identify a plurality of physical feature landmarks of the user in the visual light image such that when a quality of the received visual light image goes below a specified minimum image quality level, utilizing the IR camera of the Information Handling System (IHS) to generate an IR image of the user, and identify the physical feature landmarks of the user based on the IR image.

According to another embodiment, a posture estimation method includes the steps of utilizing a visual light camera of the Information Handling System (IHS) to generate a visual light image of a user of the HIS, and identifying a plurality of physical feature landmarks of the user in the visual light image. When a quality of the received visual light image goes below a specified minimum image quality level, the method performs the steps of utilizing an infrared (IR) camera of the Information Handling System (IHS) to generate an IR image of the user, and identifying the physical feature landmarks of the user based on the IR image.

According to yet another embodiment, a computer program product stored on a computer readable storage medium is executable by a processor to utilize a visual light camera of an Information Handling System (IHS) to generate a visual light image of a user of the HIS, and identify a plurality of physical feature landmarks of the user in the visual light image. When a quality of the received visual light image goes below a specified minimum image quality level, the computer program product is further executable to utilize an infrared (IR) camera of the Information Handling System (IHS) to generate an IR image of the user, and identify the physical feature landmarks of the user based on the IR image.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Wellness devices generally refer to those devices that aid users in selecting lifestyles or activities that enhances their overall health. Examples of such wellness devices may include, for example, fitness watches, blood pressure/heart rate monitors, and blood sugar testing devices to name a few. Due to advent of portable computing devices, such as laptop computers, and smartphones, wellness applications have been developed that leverage the capabilities of those devices. One example of a wellness application may include a SIGNALS application provided by DELL TECHNOLOGIES. One goal of the SIGNALS application is to periodically measure a user's sitting posture for providing retrospective insight for the user to be aware of the estimated amount of time spent sitting in an upright position as compared to a non-upright position. This information is intended to work with other gamification capabilities in SIGNALS application to nudge the user towards a better sitting posture in order to minimize unhealthy consequences, such as musculoskeletal disorder (MSD).

To measure a user's posture, a camera of the user's computing device (IHS) may be used along with a suitable algorithm to estimate a posture level of the user. Typically, the front-facing camera used is based on visible light imaging, and a human pose estimation algorithm used is based on training from a large volume of visible light images. This technique is good for normal and stable ambient light conditions. During extreme light conditions, such as low light environments or bright light environments, this technique often does not perform as well. More specifically, the visible light camera will yield inferior quality images due to the extreme light condition. For example, during dim light conditions, the image will often contain many pixels with dark image values, while during bright light conditions, the image will often contain many pixels with bright image values (e.g., saturated image). Both scenarios reduce image contrast, thus affecting the human pose estimation algorithm that would otherwise be used to extract important human joint landmarks information for measuring a user's posture.

Figure 1:
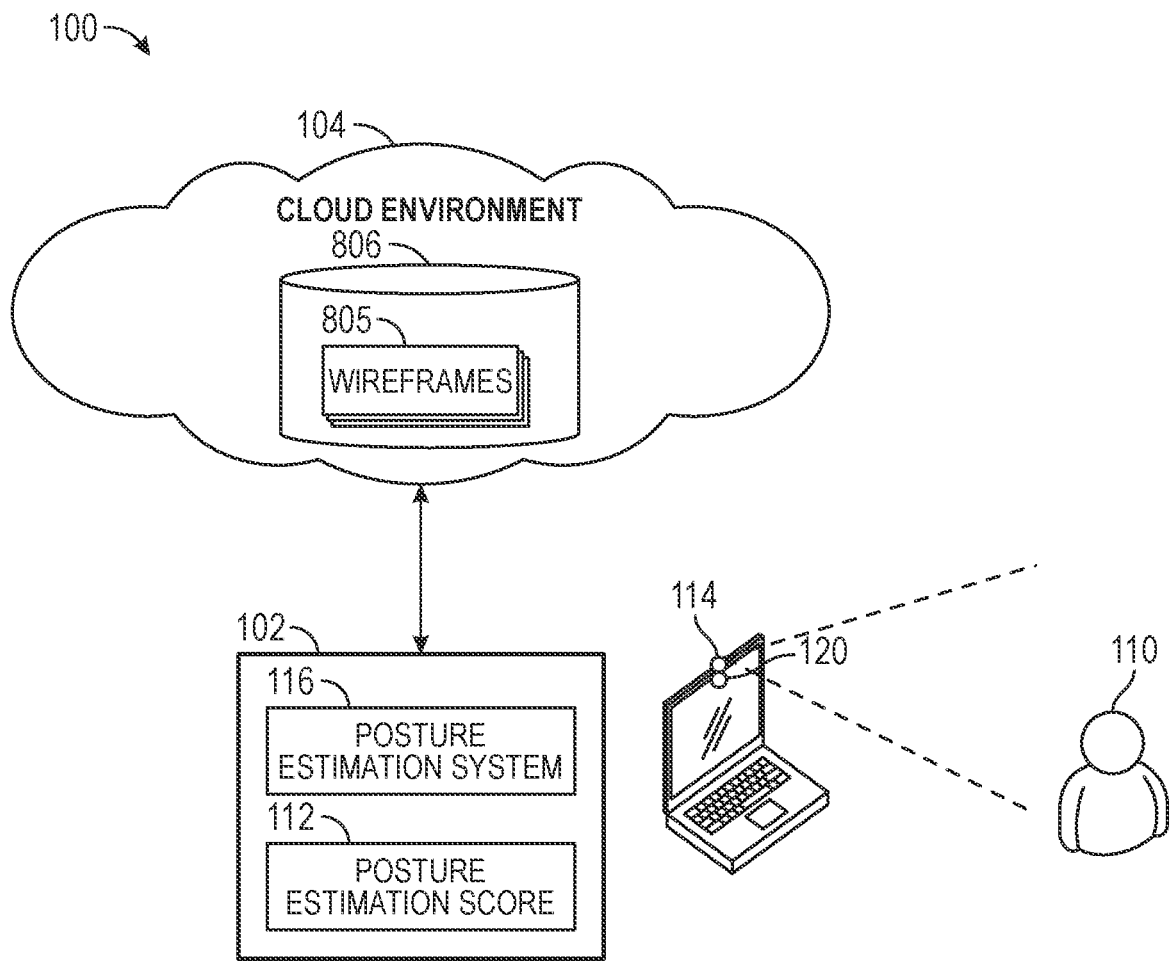
FIG. 1 illustrates an example extreme light posture estimating system according to one embodiment of the present disclosure

FIG. 1 illustrates an example extreme light posture estimating system 100 according to one embodiment of the present disclosure that may provide a solution to the aforementioned problems, among others, that only use visible light cameras. The system 100 includes an IHS 102 in communication with a cloud environment 104 (e.g., IHS support portal) that includes a database 106 that stores differing wireframes 108 that are each associated with differing levels of proper posture. The IHS 102 includes an executable posture estimation engine 116 that receives images of a user 110 from a visual light camera 114 and an infrared (IR) camera 120 of the IHS 102, and in conjunction with the cloud environment 104, processes the image by accessing the wireframes 108 stored in the cloud environment 104 to estimate a posture score 112. While the present embodiment describes the IHS 102 as accessing the wireframes 108 from an external cloud environment 104, it should be appreciated that in other embodiments, the wireframes 108 may be stored in the IHS 102 so that the system 100 may access the wireframes 108 from an internal memory of the IHS 102, thus negating the need for the cloud environment 104 in some embodiments.

According to embodiments of the present disclosure, the system 100 may continually monitor the quality of the images obtained from the visual light camera 114, such that when the quality of the imagery is reduced below a certain specified threshold level, the system 100 receives and processes IR images from an IR camera 120 so that the detrimental effects of the low quality images may be mitigated.

Many currently manufactured personal IHSs, such as laptop computers, notebook computers, smartphones, and the like come equipped with IR cameras. In some cases, the IR cameras are integrally formed with a visual light camera in a single package so that the IR camera can use the same lens that the visual light camera uses. When a personal IHS is configured with an IR camera, it may be used for various useful functions, such as for security purposes to authenticate that the current user is authorized to use certain functions of the personal IHS. More importantly, the IR camera generates imagery using IR radiation in an analogous manner to how a typical visual light camera operates. While a visual light camera receives and processes radiation in the 400-700 nanometer range, the IR camera receives and processes radiation in the 1,000-14,000 nanometer range. IR radiation within this range is often referred to as black body radiation in that it is emitted by an object (e.g., a user's body) as a factor of its thermal temperature. Thus, IR cameras may be relatively more immune to extreme lighting effects that is incurred by visual light cameras, which may be dependent upon reflected light to generate images with reasonable quality.

The user will typically operate the IHS while facing an integrated display of the IHS, or in some cases an external display that is coupled to the IHS. The physical characteristics in which the user 110 holds their body while operating the IHS may be referred to as the user's posture. Postures that are considered ergonomic are those in which the user 110 is aligned and positioned relative to the IHS such that the user's body is necessarily strained. As described, operating an IHS for prolonged periods of time while positioned in non-ergonomic postures may result in the user 110 experience a variety of physical symptoms.

The camera capabilities of the IHS are used to capture a two-dimensional image with the camera settings of the IHS configured to focus the camera on the user 110 that is positioned at their expected location while operating the IHS, such as facing the display screen of the IHS from approximately an arms-length distance from the display screen as illustrated in FIG. 1. In this manner, the camera capabilities of the IHS may be used to capture an image of the user 110 as they face the display of the IHS as they operate the IHS. In some cases, the captured image may then be processed in order to isolate the user 110 from the rest of the image, and in particular to isolate the user 110 from the background behind the user 110 and from any surfaces in front of the user 110, such as from a desk or table.

The system 100 may use the estimated posture score 112 in any suitable manner for aiding the user 110 in enhancing their posture. For example, the posture score 112 may be periodically checked against a specified threshold value such that when it is exceeded, the system 100 may generate an alert message to the user 110. As another example, the posture score 112 may be used as an input value to another machine learning (ML) process for identifying certain epochs or periods of time when the user's posture becomes less than desirable. That is, the ML process may identify a particular application (e.g., gaming application) that when executed by the user 110, causes that user's overall posture to suffer. As yet another example, the system 100 may generate a histogram that may be provided to the user 110 at periodic levels (e.g., each week, each month, etc.) to show how the user's posture has been maintained during the preceding time period.

To estimate whether a person is sitting in an upright or non-upright position from the use of visual light images and IR images provided by the camera 114, which on many portable IHSs, such as laptop computers and smart phones, is a front-facing camera, the system 100 leverages a 2D human pose estimation technique to record certain key physical feature landmarks (e.g., joint coordinate data, the user's eyes, shoulders, mouth, nose, chin, and top of the user's head, etc.) of the user 110, accessing the database 106 that stores multiple wireframes 108 of a person seated in an upright or non-upright position, and comparing the physical feature landmarks against the wireframes 108 for estimating the probability of sitting in an upright position of the user 110. A wireframe generally refers to a locus of landmarks that indicate a relative position of certain body features to one another. As will be described in detail herein below, the posture estimation engine 116 includes an IR to visible light image translation engine that translates an IR image into a visual light image so that the quality of the posture score may be enhanced during extreme lighting conditions.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

Figure 2:
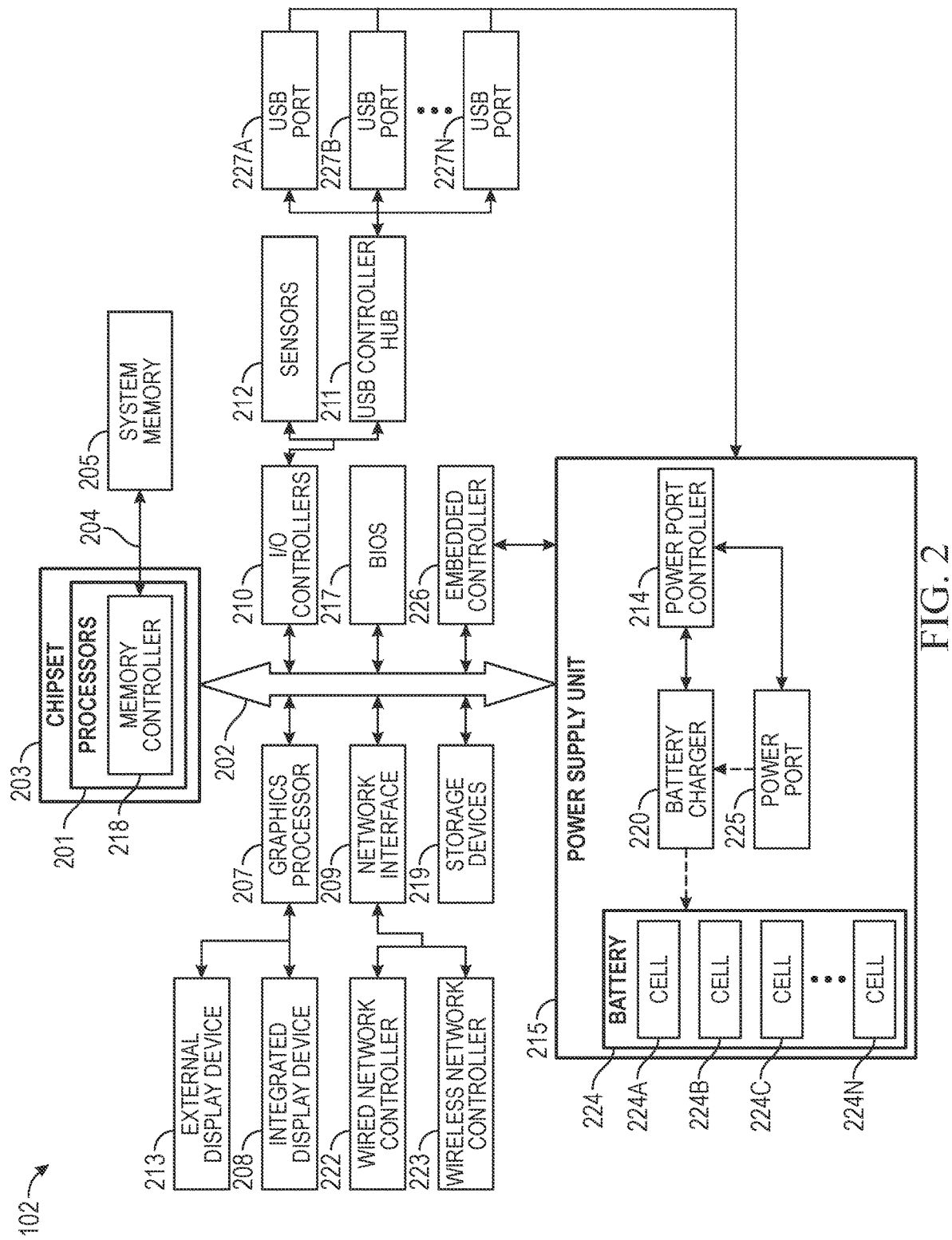
FIG. 2 is a block diagram depicting certain components of an IHS operable according to various embodiments for detecting physical postures of a user of the IHS according to one embodiment of the present disclosure.

FIG. 2 is a block diagram depicting certain components of an IHS 102 operable according to various embodiments for detecting physical postures of a user of the IHS. As described in additional detail below, IHS 102 may include capabilities for identifying and evaluating the posture in which the user of IHS 102 is physically positioned relative to the IHS, where such determinations may be made based on data collected from various I/O capabilities supported by the IHS 102. In addition, embodiments may also utilize data collected by the IHS 102 to estimate levels of risk posed by identified postures of the user. In various embodiments, IHS 102 may include an embedded controller 226 that includes logic that executes program instructions, in conjunction with operations by components of power supply unit 215 and the operating system of IHS 102, to perform the operations disclosed herein for collecting data for use in detecting physical postures of a user of the IHS 102. While a single IHS 102 is illustrated in FIG. 2, IHS 102 may be a component of an enterprise system that may include any number of additional IHSs that may also be configured in the same or analogous manner to IHS 102.

IHS 102 includes one or more processors 201, such as a Central Processing Unit (CPU), that execute code retrieved from a system memory 205. Although IHS 102 is illustrated with a single processor 201, other embodiments may include two or more processors, that may each be configured identically, or to provide specialized processing functions. Processor 201 may include any processor capable of executing program instructions, such as an Intel Pentium TM series processor or any general-purpose or embedded processors implementing any of a variety of Instruction Set Architectures (ISAs), such as the x86, POWERPC®, ARM®, SPARC®, or MIPS°ISAs, or any other suitable ISA.

In the embodiment of FIG. 2, the processor 201 includes an integrated memory controller 218 that may be implemented directly within the circuitry of the processor 201, or the memory controller 218 may be a separate integrated circuit that is located on the same die as the processor 201. The memory controller 218 may be configured to manage the transfer of data to and from the system memory 205 of the IHS 102 via a high-speed memory interface 204. The system memory 205 that is coupled to processor 201 provides the processor 201 with a high-speed memory that may be used in the execution of computer program instructions by the processor 201. Accordingly, system memory 205 may include memory components, such as such as static RAM (SRAM), dynamic RAM (DRAM), NAND Flash memory, suitable for supporting high-speed memory operations by the processor 201. In certain embodiments, system memory 205 may combine both persistent, non-volatile memory and volatile memory. In certain embodiments, the system memory 205 may be comprised of multiple removable memory modules.

IHS 102 utilizes a chipset 203 that may include one or more integrated circuits that are connected to processor 201. In the embodiment of FIG. 2, processor 201 is depicted as a component of chipset 203. In other embodiments, all of chipset 203, or portions of chipset 203 may be implemented directly within the integrated circuitry of the processor 201. Chipset 203 provides the processor(s) 201 with access to a variety of resources accessible via bus 202. In IHS 102, bus 202 is illustrated as a single element. Various embodiments may utilize any number of buses to provide the illustrated pathways served by bus 202.

As illustrated, a variety of resources may be coupled to the processor(s) 201 of the IHS 102 through the chipset 203. For instance, chipset 203 may be coupled to a network interface 209 that may support diverse types of network connectivity. In certain embodiments, IHS 102 may include one or more Network Interface Controllers (NICs), each of which may implement the hardware required for communicating via a specific networking technology, such as Wi-Fi, BLUETOOTH, Ethernet, and mobile cellular networks (e.g., CDMA, TDMA, LTE). As illustrated, network interface 209 may support network connections by wired network controllers 222 and wireless network controller 223. Each network controller 222, 223 may be coupled via various buses to the chipset 203 of IHS 102 in supporting several types of network connectivity, such as the network connectivity utilized by applications of the operating system of IHS 102.

Chipset 203 may also provide access to one or more display device(s) 208, 213 via graphics processor 207. In certain embodiments, graphics processor 207 may be comprised within a video or graphics card or within an embedded controller installed within IHS 102. In certain embodiments, graphics processor 207 may be integrated within processor 201, such as a component of a system-on-chip. Graphics processor 207 may generate display information and provide the generated information to one or more display device(s) 208, 213 coupled to the IHS 102. The one or more display devices 208, 213 coupled to IHS 102 may utilize LCD, LED, OLED, or other display technologies. Each display device 208, 213 may be capable of receiving touch inputs such as via a touch controller that may be an embedded component of the display device 208, 213 or graphics processor 207, or may be a separate component of IHS 102 accessed via bus 202. As illustrated, IHS 102 may support an integrated display device 208, such as a display integrated into a laptop, tablet, 2-in-1 convertible device, or mobile device. In some embodiments, IHS 102 may be a hybrid laptop computer that includes dual integrated displays incorporated in both of the laptop panels. IHS 102 may also support use of one or more external displays 213, such as external monitors that may be coupled to IHS 102 via diverse types of couplings.

In certain embodiments, chipset 203 may utilize one or more I/O controllers 210 that may each support hardware components such as user I/O devices and sensors 212. For instance, I/O controller 210 may provide access to one or more user I/O devices such as a keyboard, mouse, touchpad, touchscreen, microphone, speakers, camera and other input and output devices that may be coupled to IHS 102. Each of the supported user I/O devices may interface with the I/O controller 210 through wired or wireless connections. In some embodiments, the I/O devices that may be accessible by IHS 102 may include one or more cameras, which may be an integrated component of the IHS, or that may be an external device coupled to the IHS through a wired or wireless coupling. As described in additional detail below, embodiments may utilize one or more cameras of the IHS in identifying and evaluating the posture in which the user of IHS 102 is physically positioned relative to the IHS. In particular, two-dimensional images captured using the camera capabilities of the IHS may be used to identify and locate landmark features of a user, which may be used in determining the posture in which the user is currently positioned, relative to the IHS.

In certain embodiments, sensors 212 that may be accessed via I/O controllers 210 may provide access to data describing environmental and operating conditions of IHS 102. For instance, sensors 212 may include geo-location sensors capable for providing a geographic location for IHS 102, such as a GPS sensor or other location sensors configured to determine the location of IHS 102 based on triangulation and network information. Various additional sensors, such as optical, infrared and sonar sensors may provide support for xR (virtual, augmented, mixed reality) sessions hosted by the IHS 102. Such sensors 212 may provide capabilities for detecting when a user is within a certain proximity to IHS 102. For instance, sensors 212 may detect when a user is in close proximity to the IHS 102 and, in some cases, whether the user is facing the display(s) 208, 213.

As illustrated, I/O controllers 210 may include a USB controller 211 that, in some embodiments, may also implement functions of a USB hub. In some embodiments, USB controller 211 may be a dedicated microcontroller that is coupled to the motherboard of IHS 102. In other embodiments, USB controller 211 may be implemented as a function of another component, such as a component of a SoC (System on Chip) of IHS 102, embedded controller 226, processors 201 or of an operating system of IHS 102. USB controller 211 supports communications between IHS 102 and one or more USB devices coupled to IHS 102, whether the USB devices may be coupled to IHS 102 via wired or wireless connections. In some embodiments, a USB controller 211 may operate one or more USB drivers that detect the coupling of USB devices and/or power inputs to USB ports 227*a-n*. USB controller 211 may include drivers that implement functions for supporting communications between IHS 102 and coupled USB devices, where the USB drivers may support communications according to various USB protocols (e.g., USB 2.0, USB 3.0). In providing functions of a hub, USB controller 211 may support concurrent couplings by multiple USB devices via one or more USB ports 227*a-n* supported by IHS 102.

Chipset 203 also provides processor 201 with access to one or more storage devices 219. In various embodiments, storage device 219 may be integral to the IHS 102, or may be external to the IHS 102. In certain embodiments, storage device 219 may be accessed via a storage controller that may be an integrated component of the storage device. Storage device 219 may be implemented using any memory technology allowing IHS 102 to store and retrieve data. For instance, storage device 219 may be a magnetic hard disk storage drive or a solid-state storage drive. In certain embodiments, storage device 219 may be a system of storage devices, such as a cloud drive accessible via network interface 209.

As illustrated, IHS 102 also includes a BIOS (Basic Input/Output System) 217 that may be stored in a non-volatile memory accessible by chipset 203 via bus 202. In some embodiments, BIOS 217 may be implemented using a dedicated microcontroller coupled to the motherboard of IHS 102. In some embodiments, BIOS 217 may be implemented as operations of embedded controller 226. Upon powering or restarting IHS 102, processor(s) 201 may utilize BIOS 217 instructions to initialize and test hardware components coupled to the IHS 102. The BIOS 217 instructions may also load an operating system for use by the IHS 102. The BIOS 217 provides an abstraction layer that allows the operating system to interface with the hardware components of the IHS 102. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

Some IHS 102 embodiments may utilize an embedded controller 226 that may be a motherboard component of IHS 102 and may include one or more logic units. In certain embodiments, embedded controller 226 may operate from a separate power plane from the main processors 201, and thus from the operating system functions of IHS 102. In some embodiments, firmware instructions utilized by embedded controller 226 may be used to operate a secure execution environment that may include operations for providing various core functions of IHS 102, such as power management and management of certain operating modes of IHS 102.

Embedded controller 226 may also implement operations for interfacing with a power supply unit 215 in managing power for IHS 102. In certain instances, the operations of embedded controller may determine the power status of IHS 102, such as whether IHS 102 is operating strictly from battery power, whether any charging inputs are being received by power supply unit 215, and/or the appropriate mode for charging the one or more battery cells 224*a-n* using the available charging inputs. Embedded controller 226 may support routing and use of power inputs received via a USB port 227*a-n* and/or via a power port 225 supported by the power supply unit 215. In addition, operations of embedded controller 226 may interoperate with power supply unit 215 in order to provide battery status information, such as the charge level of the cells 224*a-n* of battery 224. In some embodiments, power status information collected by embedded controller 226 may be utilized in determining whether to operate user activity monitoring procedures, where the monitoring of user activity is used to determine when the user is actively operating the IHS 102 and when the user has taken a break from operating the IHS.

In some embodiments, embedded controller 226 may also interface with power supply unit 215 in monitoring the battery state of battery 224, such as the relative state of charge of battery 224, where this charge level of the battery 224 may be specified as a percentage of the full charge capacity of the battery 224. In some instance, when operating from power stored in battery 224, embedded controller 226 may detect when the voltage of the battery 224 drops below a low-voltage threshold. When the charge level of battery 224 drops below such a low-voltage threshold, embedded controller 226 may transition the IHS to an off-power state in implementing a battery protection mode that preserves a minimal power level in battery 224.

Embedded controller 226 may also implement operations for detecting certain changes to the physical configuration of IHS 102 and managing the modes corresponding to different physical configurations of IHS 102. For instance, where IHS 102 is a laptop computer or a convertible laptop computer, embedded controller 226 may receive inputs from a lid position sensor that may detect whether the two sides of the laptop have been latched together, such that the IHS is in a closed position. In response to lid position sensor detecting latching of the lid of IHS 102, embedded controller 226 may initiate operations for shutting down IHS 102 or placing IHS 102 in a low-power mode. In this manner, IHS 102 may support the use of various power modes. In some embodiments, the power modes of IHS 102 may be implemented through operations of the embedded controller 226 and power supply unit 215.

As described, IHS 102 may also include a power supply unit 215 that receives power inputs used for charging batteries 224 from which the IHS 102 operates. IHS 102 may include a power port 225 to which an AC adapter may be coupled to provide IHS 102 with a supply of DC power. The DC power input received at power port 225 may be utilized by a battery charger 220 for recharging one or more internal batteries 224 of IHS 102. As illustrated, batteries 224 utilized by IHS 102 may include one or more cells 224a-n that may connected in series or in parallel. Power supply unit 215 may support various modes for charging the cells 224a-n of battery 224 based on the power supply available to IHS 102 and based on the charge levels of the battery system 224. In certain embodiments, power supply unit 215 of IHS 102 may include a power port controller 214 that is operable for configuring operations by power port 225.

In various embodiments, an IHS 102 does not include each of the components shown in FIG. 2. In various embodiments, an IHS 102 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 201 as a systems-on-a-chip.

Figure 3:
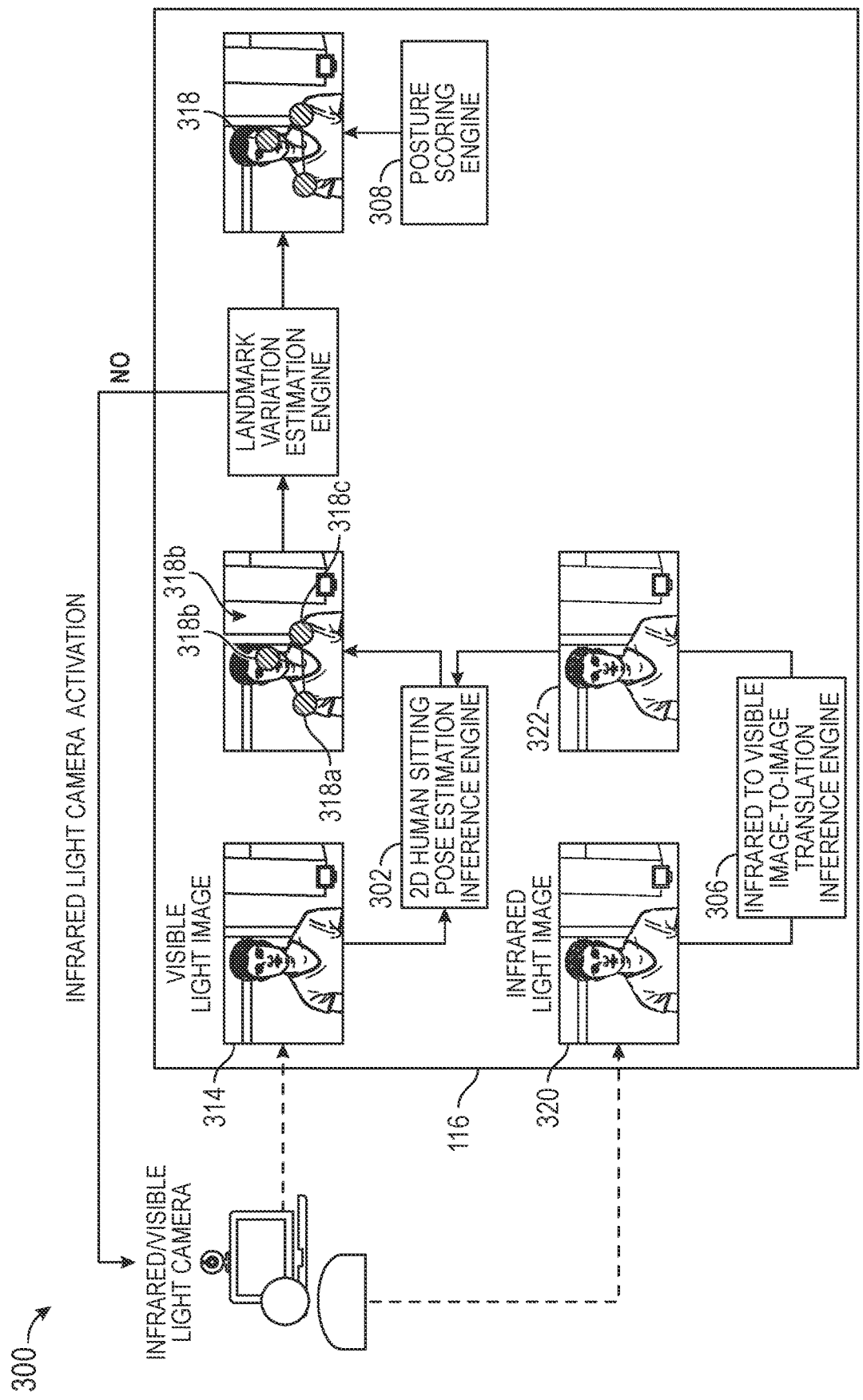
FIG. 3 illustrates several example components of the extreme light posture estimating system that may be used to obtain a posture score that will be provided to the user to indicate the probability of sitting in an upright position according to one embodiment of the present disclosure.

FIG. 3 illustrates several example components of the extreme light posture estimating system 100 that may be used to obtain a posture score that will be provided to the user to indicate the probability of sitting in an upright position according to one embodiment of the present disclosure. As shown, the posture estimation engine 116 includes a 2D posture estimation engine 302, a landmark variation estimation engine 304, an IR to visible light image translation engine 306, and a posture scoring engine 308. Nevertheless, it should be appreciated that other embodiments of the posture estimation engine 116 may include additional, different, or fewer components without deviating from the spirit and scope of the present disclosure.

When the user 110 is positioned in front of the IHS 102, the 2D posture estimation engine 302 uses the visual light camera 114 to record an image 314 of the user 110 sitting or standing in front of the IHS 102, and deploy a 2D human pose estimation model to derive a wireframe 316 comprising several key physical feature landmarks 318a-b (collectively 318). In the set of landmarks 318, landmarks 318a may correspond to the location of the ends of each of the user's shoulders, while landmark 318b may correspond to the location of the user's eyes.

The landmark variation estimation engine 304 estimates a level of variability in the currently received image 314 to multiple previously received images. The landmark variation estimation engine 304 may compare the variability of the position of each landmark 318 in the current image 314 to a specified quantity of corresponding landmarks in previous images. For example, if the frame rate of the visual light camera 114 is 30 frames-per-second and the landmark variation estimation engine 304 is to compare the variability in the landmarks over the previous 2 seconds, it will compare the landmarks 318 against corresponding landmarks in the previous 60 images.

The landmark variation estimation engine 304 may estimate the variability in any suitable manner. In one embodiment, the landmark variation estimation engine 304 may measure a standard deviation of a distribution of position values of each of the landmarks 318, and perform a regression analysis technique (e.g., k-nearest neighbor engine) to derive a single value of the variability estimate. A relatively large variability value may be interpreted to mean that an extreme light condition exists, while a relatively smaller variability value may be interpreted to mean that the extreme light condition does not exist. While the present disclosure uses a statistical probability function to determine that an extreme light condition exists, other techniques may be used without departing from the spirit and scope of the present disclosure. For example, the system 100 may measure a level of contrast in the image 314, or an overall brightness level of the image 314 to determine whether an extreme light condition exists.

If the extreme light level is determined to not exist, the wireframe 316 is sent to the posture scoring engine 308 where the posture of the user 110 may be estimated. If, however, the landmark variation estimation engine 304 determines that an extreme light level exists, it may activate the IR camera 120, which in turn, causes the IR to visible light image translation engine 306 to receive an IR image 320. The IR to visible light image translation engine 306 may then process the IR image 320 to create a translated visual light image 322. Because the IR image 320 does not depend upon the ambient light level around the user 110, the quality of the translated visual light image 322 may be superior to that of the visual light image 314. The 2D posture estimation engine 302 then deploys the 2D human pose estimation model to derive another improved wireframe 316 that is largely based on the IR image 320 obtained from the IR camera 120. Thus as shown, the IR camera 120 may be used to aid in posture estimation enhancement, and in particular, when extreme light conditions exist.

The posture scoring engine 308 may derive a score for the posture of the user 110 in any suitable manner. In general, the posture score generally refers to a probability of the user sitting in an upright or in a non-upright position. In one embodiment, the posture scoring engine 308 may send the physical feature landmarks to a cloud environment (e.g., IHS vendor support portal), which uses a regression analysis technique (e.g., k-nearest neighbor engine) that compares the wireframe 318 against a database of model wireframes associated with a human structure with varying levels of posture ranging from non-ergonomic (e.g., bad posture) to ergonomic (e.g., good posture). Additionally, the model wireframes may be associated with an assessed, known posture score. Once the posture score is obtained, the cloud environment may send the estimated posture score to the IHS 102 for the user to comprehend the probability of sitting in an upright position. Any suitable regression analysis technique may be used without departing from the spirit and scope of the present disclosure.

Figure 4:
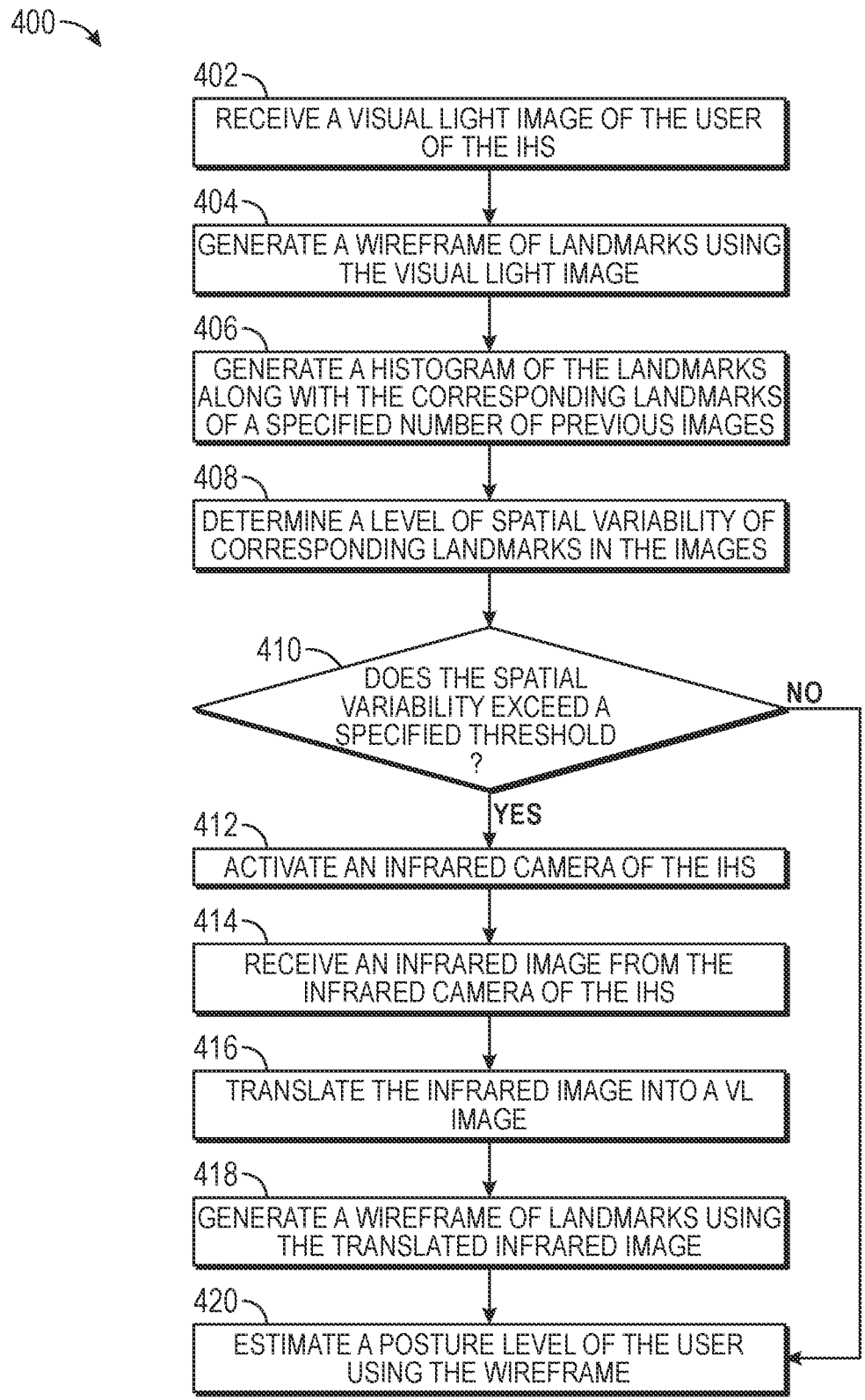
FIG. 4 illustrates an example posture estimating method that may be used to estimate a posture of a user in extreme light conditions according to one embodiment of the present disclosure.

FIG. 4 illustrates an example posture estimating method 400 that may be used to estimate a posture of a user in extreme light conditions according to one embodiment of the present disclosure. Additionally or alternatively, certain steps of the method 400 may be performed by the posture estimation engine 116 and/or by a cloud environment administered by a vendor of the IHS 102. The method 400 can be performed at ongoing intervals to continually assess the posture of the user. In one embodiment, the rate at which the method 400 is performed may be adjusted based on certain factors, such as when the posture level of the user deteriorates or improves, during certain periods of the day (e.g., morning, lunch time, afternoon, evening, night, etc.), and/or in response to detecting a lack of movement and/or activity by the user for over a certain duration of time. Embodiments of the present disclosure may generate a risk score based on the detected posture of the user, where the risk score quantifies the risk of physical side effects for particular non-ergonomic postures. In such embodiments, embodiments may initiate posture detection procedures more regularly as the risk scores for the user's posture increase. As such, embodiments may detect postures more frequently for users with poor ergonomics.

At step 402, the method 400 receives a visual light image of the user of the IHS. The visual light image may be obtained, for example, from a visual light camera configured on the IHS. The method 400 then generates a wireframe of landmarks using the visual light image at step 404. The landmarks may include any feature of the user, such as joint coordinate data, the user's eyes, shoulders, mouth, nose, chin, and top of the user's head, and the like. At step 406, generates a histogram of the landmarks along with the corresponding landmarks of a specified number of previous images. Any quantity of previous images may be used that when the histogram is created, a relatively well-formed normal distribution of the histogram may be obtained. The method 400 then determines a level of spatial variability of corresponding landmarks in the images at step 408. For example, the method 400 may calculate a standard deviation for the histogram.

At step 410, the method 400 determines whether the level of spatial variability exceeds a specified threshold. Because the level of spatial variability may be considered to be proportional to the level of extreme ambient light around the user, as the spatial variability increases, the level of extreme light also increases. If the level of spatial variability exceeds the threshold value, processing continues at step 410; otherwise, processing continues at step 418 in which the method 400 processes the wireframe generated according to the visual light image to estimate a posture of the user.

At step 412, the method 400 activates an infrared camera of the IHS. The IR camera may be positioned proximate to and oriented in the same direction as the visual light camera so that the IR camera may generate imagery with a relatively same field-of-view as the visual light camera. In some embodiments, the IR camera may be integrally formed with the visual light camera such that both the IR camera and visual light camera use the same lens.

At step 414, the method 400 receives an infrared image from the infrared camera of the IHS, and translates the infrared image into a visual light image at step 416. Using the translated visual light image, the method 400 generates a wireframe of landmarks using the translated infrared image at step 418. Thereafter at step 420, the method estimates a posture level of the user using the IR image based wireframe. Thus, the method 400 may estimate the posture of the user using a visual light based image or an IR based image. That is, visual light based images may be used during normal lighting conditions, while IR based images may be used in extreme light conditions that may cause posture estimation to become excessively inaccurate.

Although FIG. 4 describes an example method 400 that may be performed for estimating a posture level of a user, the features of the method 400 may be embodied in other specific forms without deviating from the spirit and scope of the present disclosure. For example, the method 400 may perform additional, fewer, or different operations than those described in the present examples. As another example, the steps of the aforedescribed method 400 may be performed in a sequence other than what is described above. As yet another example, some, most, or all steps of the method 400 may be performed by an IHS other than the IHS 102.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
one or more processors;
a visual light camera and an infrared (IR) camera;
a memory device coupled to the one or more processors, the memory device storing computer-readable instructions that, upon execution by the one or more processors, cause the IHS to:
utilize the visual light camera of the IHS to generate a visual light image of a user of the IHS;
identify a plurality of physical feature landmarks of the user in the visual light image;
when a quality of the received visual light image goes below a specified minimum image quality level, utilizing the IR camera of the Information Handling System (IHS) to generate an IR image of the user;
identify the physical feature landmarks of the user based on the IR image;
create a histogram comprising the physical feature landmarks of the visual light image and the physical feature landmarks of a specified quantity of previous visual light images;
determine a spatial variability of corresponding physical feature landmarks in the visual light images; and
determine that the spatial variability has exceeded a specified maximum variability threshold to determine that the quality of the received visual light image has gone below the specified minimum image quality level.

2. The IHS of claim 1, wherein the instructions, upon execution, cause the IHS to determine a posture score of the user using the physical feature landmarks based on the IR image.

3. The IHS of claim 2, wherein the instructions, upon execution, cause the IHS to estimate the posture score of the user using a regression analysis technique.

4. The IHS of claim 1, wherein the instructions, upon execution, cause the IHS to determine the spatial variability of the physical feature landmarks based on the IR image using a standard deviation measurement of the of the histogram.

5. The IHS of claim 1, wherein the instructions, upon execution, cause the IHS to, when the quality of the received visual light image does not go below the specified minimum image quality level, identify the physical feature landmarks of the user based on the visual light image.

6. The IHS of claim 1, wherein the instructions, upon execution, cause the IHS to:
translate the received IR image into a translated visual light image using a translation inference engine; and
identify the physical feature landmarks of the user using the translated visual light image.

7. The IHS of claim 1, wherein the instructions, upon execution, cause the IHS to identify the plurality of physical feature landmarks of the user based on the IR image using a two-dimensional (2D) posture estimation inference engine.

8. A posture estimation method comprising:
utilizing a visual light camera of the Information Handling System (IHS) to generate a visual light image of a user of the IHS;
identifying a plurality of physical feature landmarks of the user in the visual light image;
when a quality of the received visual light image goes below a specified minimum image quality level, utilizing an infrared (IR) camera of the Information Handling System (IHS) to generate an IR image of the user;
identifying the physical feature landmarks of the user based on the IR image;
creating a histogram comprising the physical feature landmarks of the visual light image and the physical feature landmarks of a specified quantity of previous visual light images;
determining a spatial variability of corresponding physical feature landmarks in the visual light images using a standard deviation measurement of the of the histogram; and
determining that the spatial variability has exceeded a specified maximum variability threshold to determine that the quality of the received visual light image has gone below the specified minimum image quality level.

9. The method of claim 8, further comprising determining a posture score of the user using the physical feature landmarks using a regression analysis technique.

10. The method of claim 8, further comprising, when the quality of the received visual light image does not go below the specified minimum image quality level, identifying the physical feature landmarks of the user based on the visual light image.

11. The method of claim 8, further comprising:
translating the received IR image into a translated visual light image using a translation inference engine; and
identifying the physical feature landmarks of the user using the translated visual light image.

12. The method of claim 8, further comprising identifying the plurality of physical feature landmarks of the user based on the IR image using a two- dimensional (2D) posture estimation inference engine.

13. A computer program product comprising a non-transitory computer readable storage medium having program instructions embodied therewith, the program instructions executable by a processor to cause the processor to perform the following:
utilize a visual light camera of an Information Handling System (IHS) to generate a visual light image of a user of the IHS;
identify a plurality of physical feature landmarks of the user in the visual light image;
when a quality of the received visual light image goes below a specified minimum image quality level, utilize an infrared (IR) camera of the Information Handling System (IHS) to generate an IR image of the user;
identify the physical feature landmarks of the user based on the IR image;
create a histogram comprising the physical feature landmarks of the visual light image and the physical feature landmarks of a specified quantity of previous visual light images;

determine a spatial variability of corresponding physical feature landmarks in the visual light images; and determine that the spatial variability has exceeded a specified maximum variability threshold to determine that the quality of the received visual light image has gone below the specified minimum image quality level.

14. The computer program product of claim 13, wherein the instructions, upon execution, cause the IHS to determine, using the physical feature landmarks, a posture score of the user using a regression analysis technique.

15. The computer program product of claim 13, wherein the instructions, upon execution, cause the IHS to, when the quality of the received visual light image does not go below the specified minimum image quality level, identify the physical feature landmarks of the user based on the visual light image.

16. The computer program product of claim 13, wherein the instructions, upon execution, cause the IHS to:

translate the received IR image into a translated visual light image using a translation inference engine; and identify the physical feature landmarks of the user using the translated visual light image.

17. The computer program product of claim 13, wherein the instructions, upon execution, cause the IHS to identify the plurality of physical feature landmarks of the user using a two-dimensional (2D) posture estimation inference engine.

* * * * *

UNITED STATES PATENT AND TRADEMARK OFFICE
CERTIFICATE OF CORRECTION

PATENT NO. : 11,836,825 B1
APPLICATION NO. : 17/664480
DATED : December 5, 2023
INVENTOR(S) : Loo Shing Tan and Seng Khoon Teh It is certified that error appears in the above-identified patent and that said Letters Patent is hereby corrected as shown below:

On the Title Page

ABSTRACT (57), Line 3, delete "extreme lighting conditions. In particular, the HIS include" and insert --extreme lighting conditions. In particular, the IHS includes-- therefor.

ABSTRACT (57), Line 5, delete "the IHS to generate a visual light image of a user of the HIS," and insert --the IHS to generate a visual light image of a user of the IHS,-- therefor.

In the Claims

In Column 13, Line 57, Claim 4, delete "using a standard deviation measurement of the of the his-" and insert --using a standard deviation measurement of the his- -- therefor.

In Column 14, Line 25, Claim 8, delete "standard deviation measurement of the of the histo-" and insert --standard deviation measurement of the histo- -- therefor.

In Column 14, Line 46, Claim 12, delete "on the IR image using a two- dimensional (2D) posture" and insert --on the IR image using a two-dimensional (2D) posture-- therefor.

Signed and Sealed this
Second Day of January, 2024

Katherine Kelly Vidal
*Director of the United States Patent and Trademark Office*